(12) United States Patent
Zhang et al.

(10) Patent No.: US 11,368,018 B2
(45) Date of Patent: Jun. 21, 2022

(54) HYBRID CASCADED APF TOPOLOGY AND CONTROL METHOD THEREFOR

(71) Applicant: SHANDONG UNIVERSITY, Shandong (CN)

(72) Inventors: Chenghui Zhang, Jinan (CN); Xi Liu, Jinan (CN); Hua Geng, Jinan (CN); Xiangyang Xing, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 17/159,884

(22) PCT Filed: Dec. 28, 2019

(86) PCT No.: PCT/CN2019/129556
§ 371 (c)(1),
(2) Date: Jan. 27, 2021

(87) PCT Pub. No.: WO2020/211458
PCT Pub. Date: Oct. 22, 2020

(65) Prior Publication Data
US 2021/0391719 A1      Dec. 16, 2021

(30) Foreign Application Priority Data
Apr. 17, 2019   (CN) .......................... 201910308299.X

(51) Int. Cl.
*H02M 7/06*      (2006.01)
*H02M 7/00*      (2006.01)
(Continued)

(52) U.S. Cl.
CPC . *H02J 3/01* (2013.01); *H02J 3/16* (2013.01)

(58) Field of Classification Search
CPC .......... H02M 7/06; H02M 7/00; H02M 7/155; H02M 7/217; H02J 3/01
See application file for complete search history.

(56) References Cited

U.S. PATENT DOCUMENTS

| | | | |
|---|---|---|---|
| 9,595,902 B2 * | 3/2017 | Gallegos-Lopez | ..... H02P 21/18 |
| 2008/0304300 A1 * | 12/2008 | Raju | ...................... H02M 7/217 |
| | | | 363/126 |

(Continued)

FOREIGN PATENT DOCUMENTS

| | | |
|---|---|---|
| CN | 102511123 A | 6/2012 |
| CN | 103236800 A | 8/2013 |

(Continued)

OTHER PUBLICATIONS

Mar. 27, 2020 Search Report issued in International Patent Application No. PCT/CN2019/129556.

(Continued)

*Primary Examiner* — Jared Fureman
*Assistant Examiner* — Esayas G Yeshaw
(74) *Attorney, Agent, or Firm* — Oliff PLC

(57) ABSTRACT

A hybrid cascaded APF topology and control method therefor for improving the ability of a system to compensate for higher harmonics, raise the quality of electric energy of output currents, and reduce costs. The topology includes: a three-phase cascaded H-bridge including bridge arms of three phases, each bridge arm including a plurality of H-bridge cells connected in series, and the bridge arms of the three phases connected to a power system needing active filtering via inductors; and a three-phase H-bridge circuit connected at star connection points of the three-phase cascaded H-bridge, the three-phase H-bridge circuit including branches of the three phases and two capacitors connected in parallel across the branches of the three phases, and the branch of each phase including two switching transistors connected in series, where switching transistors of the H-bridge cells use Si devices, and the switching transistors of the three-phase H-bridge circuit use SiC devices.

9 Claims, 4 Drawing Sheets

(51) Int. Cl.
    *H02J 3/01*         (2006.01)
    *H02J 3/16*         (2006.01)

(56) References Cited

U.S. PATENT DOCUMENTS

| | | | |
|---|---|---|---|
| 2012/0104961 A1* | 5/2012 | Iwamoto | H05B 41/2886 |
| | | | 315/224 |
| 2014/0062458 A1* | 3/2014 | Gabriel Bergas | H02J 3/1864 |
| | | | 324/87 |
| 2014/0063874 A1* | 3/2014 | Liu | H02M 3/3376 |
| | | | 363/40 |
| 2015/0249403 A1* | 9/2015 | Sato | H02M 7/25 |
| | | | 363/127 |
| 2015/0343911 A1* | 12/2015 | White | H02M 7/5387 |
| | | | 290/16 |
| 2019/0115820 A1* | 4/2019 | Fu | H02M 1/08 |
| 2019/0252134 A1* | 8/2019 | Haes | H02H 3/021 |
| 2019/0348840 A1* | 11/2019 | Riaz | H02J 3/38 |

FOREIGN PATENT DOCUMENTS

| | | |
|---|---|---|
| CN | 104682751 A | 6/2015 |
| CN | 104716656 A | 6/2015 |
| CN | 105337281 A | 2/2016 |
| CN | 109873424 A | 6/2019 |
| JP | 5260957 B2 | 8/2013 |

OTHER PUBLICATIONS

Mar. 27, 2020 Written Opinion of the International Searching Authority issued in International Patent Application No. PCT/CN2019/129556.

* cited by examiner

HYBRID CASCADED APF TOPOLOGY AND CONTROL METHOD THEREFOR

BACKGROUND

Technical Field

The disclosure relates to a hybrid cascaded APF topology and a control method therefor.

Related Art

This section only provides background information of the disclosure and does not necessarily constitute the prior art.

With the rapid development of power electronics technologies, a large number of non-linear devices find wide application in the field of converting technologies. The wide application of the non-linear devices has become a main source of harmonics of a power grid, thus resulting in a serious impact on the quality of electric energy of the power grid. Therefore, it is essential to effectively control harmonics in a power system, so as to achieve safe, efficient, stable, and economic operation of the power grid.

Compared with a passive filter that can only passively absorb harmonics of a fixed frequency and magnitude, an active power filter (APF) is capable of quick tracking of and dynamic compensation for harmonics of different magnitudes and frequencies, thus effectively reducing the harmonics of the power grid and improving the quality of the electric energy. A cascaded H-bridge APF has a wide variety of applications since its main circuit can be easily designed and it can assume multi-level design and modular design.

However, according to the inventor, a conventional cascaded H-bridge APF commonly uses Si power devices with low switching frequencies, which makes it difficult for the APF to compensate for higher harmonics. The use of SiC power devices may allow the APF to operate at high switching frequencies, and the higher harmonics can be effectively compensated for with a low switching loss. However, high-voltage SiC power devices are expensive and are not suitable for large-scale engineering applications.

SUMMARY

To address the above problems, there are provided a hybrid cascaded APF topology and a control method therefor. The disclosure can improve the ability of a system to compensate for higher harmonics, raise the quality of electric energy of output currents, and reduce costs.

According to some embodiments, the following technical solutions are employed in the disclosure.

A hybrid cascaded APF topology includes: a three-phase cascaded H-bridge including bridge arms of three phases, the bridge arm of each phase including a plurality of H-bridge cells connected in series, and the bridge arms of the three phases being connected to a power system needing active filtering via inductors; and a three-phase H-bridge circuit connected at star connection points of the three-phase cascaded H-bridge, the three-phase H-bridge circuit including branches of the three phases and two capacitors connected in parallel across the branches of the three phases, and the branch of each phase including two switching transistors connected in series, where switching transistors of the H-bridge cells use Si devices, and the switching transistors of the three-phase H-bridge circuit use SiC devices.

In the disclosure, a three-phase H-bridge circuit is added which uses SiC power devices, thus allowing for a reduction of switching losses of a system, an increase in switching frequencies, and an effective compensation for higher harmonics. The three-phase cascaded H-bridge uses Si power devices, which reduces a voltage that the SiC power devices withstand, while decreasing the cost of the topology. The APF topology is cost-effective due to a series-parallel connection of the Si power devices and the SiC power devices.

In an implementation, a bridge arm extends from a midpoint of the two capacitors of the three-phase H-bridge circuit, the bridge arm being connected to the power system. Therefore, the APF topology is also applicable to operating conditions of a three-phase four-wire system.

In an implementation, a number of the H-bridge cells of the bridge arm of each phase is determined according to actual requirements for voltage levels. The method can be widely used in different occasions with low and medium voltages, and is therefore highly expandable and practicable.

Based on the control method for the topology described above, the H-bridge cells generate a fundamental voltage required by the APF topology by using a first switching frequency; and the three-phase H-bridge circuit is responsible for a portion of the fundamental voltage or is not responsible for the fundamental voltage, and the three-phase H-bridge circuit uses a second switching frequency for harmonic compensation.

In an implementation, the second switching frequency is greater than the first switching frequency.

In an implementation, the portion of the fundamental voltage is 0%-40% of a total fundamental voltage.

In an implementation, a modulation wave is separated into a fundamental modulation wave and a harmonic modulation wave, a magnitude of the fundamental modulation wave is compared with a magnitude of a low-frequency carrier wave, and the switching transistors of the H-bridge cells are driven according to a result of the comparison; and a magnitude of the harmonic modulation wave is compared with a magnitude of a high-frequency carrier wave, and the switching transistors of the three-phase H-bridge circuit are driven according to a result of the comparison.

Based on the control method for the topology described above, a phase angle is derived from line side three-phase voltages, abc/dq and dq/abc coordinate transformations are performed based on the phase angle, values of harmonic currents of uncompensated currents of the three phases are derived based on an instantaneous reactive power theory, and with the values of the harmonic currents as given current values, an initial modulation wave is generated by performing a coordinate transformation on output currents of the topology;

a voltage balancing signal is generated according to a capacitive voltage value and a given value of the H-bridge cells of the bridge arms of the three phases; and the voltage balancing signal is superposed with the initial modulation wave to generate a final modulation signal.

A computer-readable storage medium stores a plurality of instructions therein, the instructions being loadable by a processor of a terminal device and suitable for executing the control method.

A terminal device includes a processor and a computer-readable storage medium, wherein the processor is configured to execute instructions; and the computer-readable storage medium is configured to store a plurality of instructions, the instructions being loadable by a processor and suitable for executing the control method.

Compared with the prior art, the present disclosure has the following beneficial effects.

1. In the disclosure, SiC power devices are used, which allows for a reduction of switching losses of a system, an increase in switching frequencies, and an effective compensation for higher harmonics.

2. In the disclosure, a fundamental voltage is shared with H-bridge cells consisting of Si power devices, which effectively reduces a voltage borne by the SiC power devices and reduces the cost of the topology.

3. In the disclosure, the Si power devices and the SiC power devices are placed in a series-parallel connection, which contributes to forming a cost-effective APF topology.

4. The disclosure can be adapted for operating conditions of a three-phase four-wire system through a simple improvement, thus having a high practicability.

5. In the disclosure, a number of H-bridge cells can be selected according to actual requirements for voltage levels, in such a way that the topology and the control method can be widely used in different occasions with low and medium voltages, and are therefore highly expandable and practicable.

BRIEF DESCRIPTION OF THE DRAWINGS

The accompanying drawings constituting a part of the disclosure are used to provide further understanding of the disclosure. Exemplary embodiments of the disclosure and descriptions thereof are used to explain the disclosure, and do not constitute an improper limitation to the disclosure.

DETAILED DESCRIPTION

The disclosure is further described below with reference to the accompanying drawings and embodiments.

It should be noted that the following detailed descriptions are all exemplary and are intended to provide a further description of the disclosure. Unless otherwise specified, all technical and scientific terms used herein have the same meaning as commonly understood by those of ordinary skill in the art to which the disclosure belongs.

It should be noted that terms used herein are only for describing specific implementations and are not intended to limit exemplary implementations according to the disclosure. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof.

A hybrid cascaded APF topology includes a three-phase cascaded H-bridge consisting of H-bridge cells, and a three-phase H-bridge circuit having capacitors that is connected at star connection points adjacent to a conventional cascaded H-bridge. Switching transistors of the H-bridge cells use Si devices, and switching transistors of the three-phase H-bridge circuit use SiC devices. Bridge arms of three phases of the APF are connected to a power system needing active filtering via inductors. In addition, a bridge arm may extend from a midpoint of the capacitors of the three-phase H-bridge circuit, so that the APF topology can be applicable to operating conditions of a three-phase four-wire system.

The control method for the hybrid cascaded APF topology described above specifically includes two parts:

1. A switching frequency and a modulation scheme employed for the H-bridge cells are different from those employed for the three-phase H-bridge circuit. A fundamental voltage required by the APF is generated by the H-bridge cells by using a low switching frequency. The three-phase H-bridge circuit (three-phase H-bridge for short) is responsible for little or no fundamental voltage, and uses a high switching frequency for harmonic compensation. Therefore, a multilevel hybrid modulation method for the hybrid cascaded APF topology described above is formed.

2. The control method for the hybrid cascaded APF system includes: deriving values of harmonic currents needing compensation based on an instantaneous reactive power theory; stabilizing a capacitive voltage through a capacitive voltage stabilizing module; and compensating for the harmonic currents through the hybrid modulation method described above.

Figure 1:
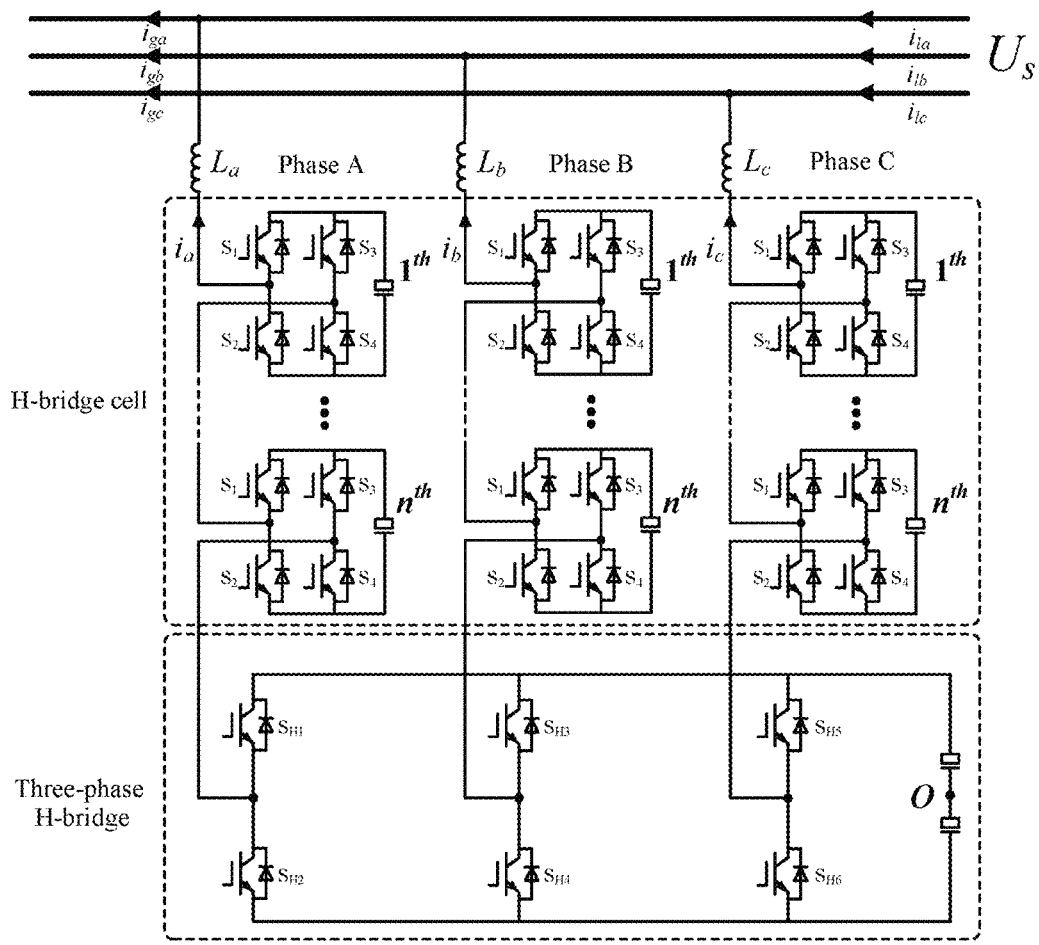
FIG. 1 is a hybrid cascaded APF topology.

FIG. 1 is a hybrid cascaded APF topology. The topology includes a cascaded H-bridge consisting of H-bridge cells and a three-phase H-bridge circuit having capacitors that is connected at star connection points adjacent to the cascaded H-bridge. Switching transistors of the cascaded H-bridge cells use Si devices, and switching transistors of the three-phase H-bridge use SiC devices. Bridge arms of three phases of the APF are connected to a power system needing active filtering via inductors. In addition, a bridge arm may extend from a midpoint O of the capacitors of the three-phase H-bridge, so that the APF topology can be applicable to operating conditions of a three-phase four-wire system.

In this embodiment, a switching frequency and a modulation scheme employed for the H-bridge cells are different from those employed for the three-phase H-bridge. The method of this embodiment is also applicable to a situation of a plurality of H-bridge cells per phase, and a specific description is given below with respect to a situation of a single H-bridge cell per phase.

A modulation wave is separated into a fundamental modulation wave and a harmonic modulation wave. The fundamental modulation wave is configured to drive the H-bridge cells depending on a comparison with a low frequency carrier wave. If the modulation wave is greater than or equal to the carrier wave, switches ($S_1$, $S_2$, $S_3$, $S_4$) of the H-bridge cells in FIG. 1 take values (1, 0, 0, 1), or otherwise (0, 1, 1, 0). The harmonic modulation wave drives the three-phase H-bridge depending on a comparison with a high frequency carrier wave, in a similar manner to a two-level three-phase inverter.

Figure 2:
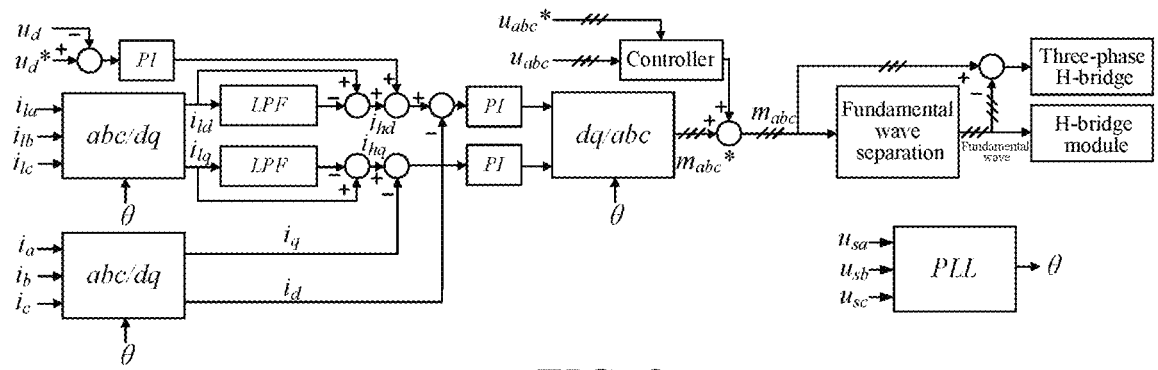
FIG. 2 is a block diagram of a controller of a control system according to this embodiment.

FIG. 2 is a block diagram of a controller of a control system according to this embodiment.

A phase angle θ is derived from line side three-phase voltages $u_{sa}$, $u_{sb}$, and $u_{sc}$ by a phase-locked loop (PLL), for abc/dq and dq/abc coordinate transformations. Values of harmonic currents $i_{hd}$ and $i_{hq}$ of uncompensated currents $i_{la}$, $i_{lb}$, and $i_{lc}$ are derived based on an instantaneous reactive power theory. LPF is a low pass filter. A DC side capacitive voltage stabilizing loop is added to the harmonic currents to stabilize a value of a DC side voltage of the three-phase cascaded H-bridge. $u_d$ is a measured value of the DC side voltage, and $u_d^*$ is a given value of the DC side voltage. With the values of the harmonic currents $i_{hd}$ and $i_{hq}$ as given current values, an initial modulation wave $m_{abc}^*$ is generated from currents $i_a$, $i_b$, and $i_c$ output from the APF through a coordinate transformation and current loops. A capacitive voltage value $u_{abc}$ of the H-bridge cells of the three phases a, b, and c as well as a given value $u_{abc}^*$ are passed through the controller to generate a voltage balancing signal, which is superposed with the initial modulation wave $m_{abc}^*$ to generate a modulation signal $m_{abc}$. Taking the situation of a single H-bridge per phase as an example, a voltage balancing controller may be formed by a PI loop consisting of the voltage value $u_{abc}$ and the given value $u_{abc}^*$, in a similar manner to DC capacitive voltage stabilization.

Figure 3:
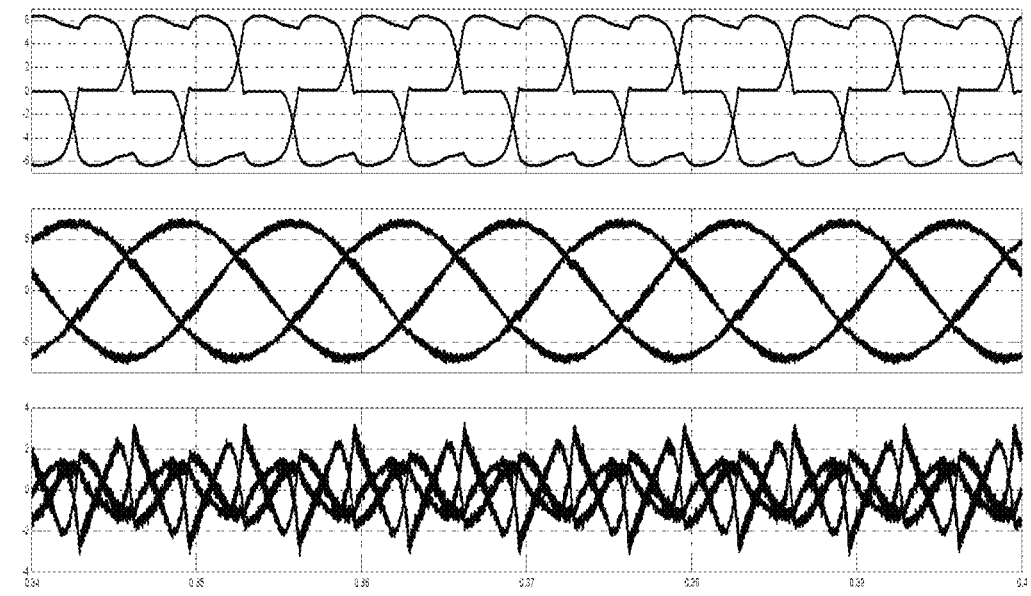
FIG. 3 is a schematic diagram of an effect of compensation by the hybrid cascaded APF.

FIG. 3 is a schematic diagram of an effect of compensation by the hybrid cascaded APF, which, from top to bottom, successively shows the uncompensated currents $i_{la}$, $i_{lb}$, and $i_{lc}$, compensated currents $i_{ga}$, $i_{gb}$, and $i_{gc}$, and the compensation currents $i_a$, $i_b$, and $i_c$. It can be seen from the waveforms that a satisfactory compensation is achieved for the system currents.

Figure 4A:
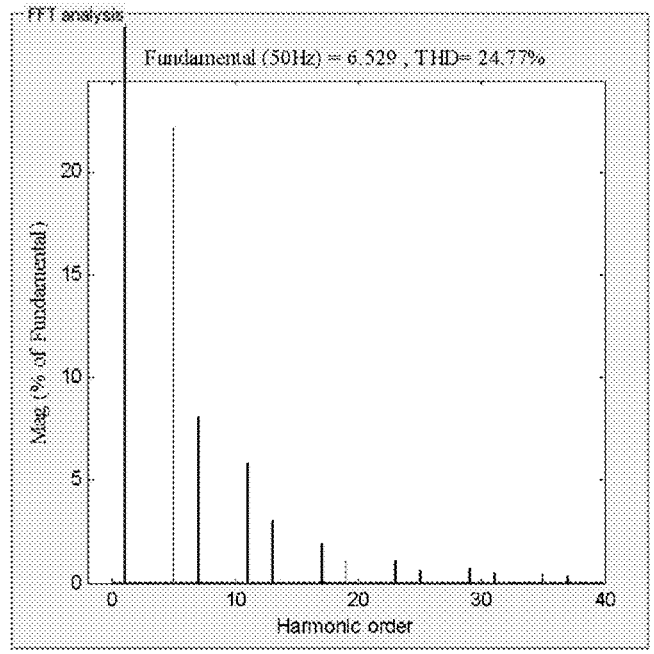
FIG. 4(*a*) and FIG. 4(*b*) are diagrams showing THD effects before and after the compensation for current harmonics according to this embodiment.
Figure 4B:
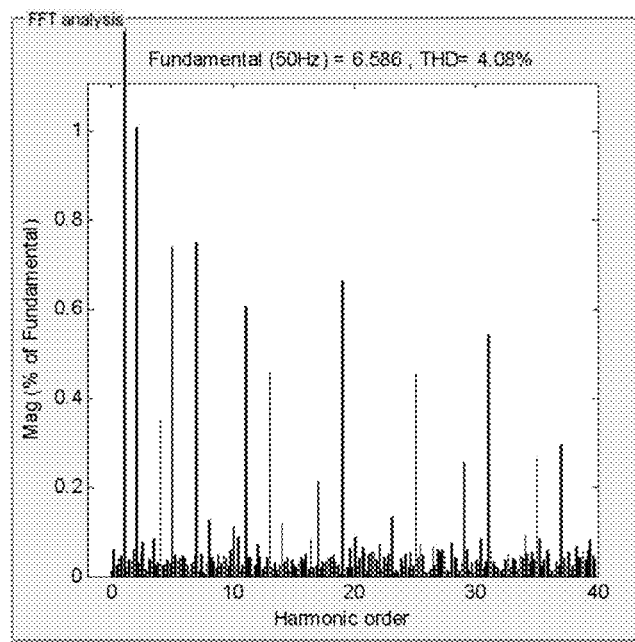

FIG. 4(a) shows a THD before the compensation, and (b) shows a THD after the compensation. It can be seen from the THDs based on FFT analyses before and after the compensation for the current harmonics that a satisfactory compensation is achieved for the system currents.

Figure 5:
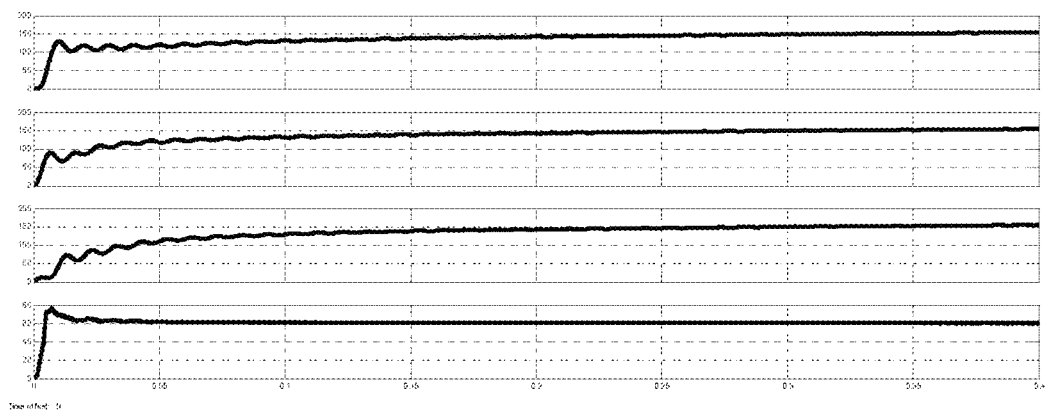
FIG. 5 is a schematic diagram of capacitive voltage balancing according to this embodiment.

FIG. 5 is a schematic diagram of capacitive voltage balancing according to this embodiment. Taking the situation of a single H-bridge cell per phase as an example, there are shown successively from top to bottom a value of a capacitive voltage of the H-bridge cell of a phase a, a value of a capacitive voltage of the H-bridge cell of a phase b, a value of a capacitive voltage of the H-bridge cell of a phase c, and a value of a DC capacitive voltage of the H-bridge cells of the three phases. It can be seen from the figure that the capacitive voltages are controlled.

Therefore, the method of this embodiment can realize a cost-effective and efficient compensation for higher harmonics through a combination of Sic devices and Si devices, i.e., a three-phase cascaded H-bridge consisting of H-bridge cells, and a three-phase H-bridge circuit having capacitors that is connected at star connection points adjacent to a conventional cascaded H-bridge. Switching transistors of the H-bridge cells use Si devices, and switching transistors of the three-phase H-bridge use SiC devices. Bridge arms of three phases of the APF are connected to a power system needing active filtering via inductors. A switching frequency and a modulation scheme employed for the H-bridge cells are different from those employed for the three-phase H-bridge. A fundamental voltage required by the APF is generated by the H-bridge cells by using a low switching frequency. The three-phase H-bridge is responsible for little or no fundamental voltage, and uses a high switching frequency for harmonic compensation. Relevant control is mainly directed at a source of harmonics and stabilization of voltages of the APF.

In addition, this embodiment can be adapted for operating conditions of a three-phase four-wire system through a simple improvement, thus having a high practicability. A number of H-bridge cells can be selected according to actual requirements for voltage levels, in such a way that the method can be widely used in different occasions with low and medium voltages, and is therefore highly expandable and practicable. The method is easy to implement, highly expandable, easy to apply, and highly practicable, and is promising in the fields of power systems and renewable energy generation.

Persons skilled in the art should understand that the embodiments of the disclosure may be provided as a method, a system, or a computer program product. Therefore, the disclosure may be implemented in hardware alone, software alone, or a combination of software and hardware. Moreover, the disclosure may be in the form of a computer program product implemented on one or more computer-usable storage media (including, but not limited to, a disk storage, a CD-ROM, an optical storage, etc.) containing computer-usable program codes therein.

The disclosure is described with reference to flowcharts and/or block diagrams of the method, the device (system), and the computer program product according to the embodiments of the disclosure. It should be understood that each process and/or block in the flowcharts and/or block diagrams, and a combination of processes and/or blocks in the flowcharts and/or block diagrams can be realized by computer program instructions. These computer program instructions may be provided to a processor of a general-purpose computer, a special-purpose computer, an embedded processing machine, or other programmable data processing devices to generate a machine, so that execution of the instructions by the processor of the computer or other programmable data processing devices generates a means for implementing functions specified in one or more processes of the flowcharts and/or one or more blocks of the block diagrams.

These computer program instructions may also be stored in a computer-readable storage that can cause the computer or other programmable data processing devices to operate in such a way that the instructions stored in the computer-readable storage generate an article of manufacture including an instruction means which implements the functions specified in one or more processes of the flowcharts and/or one or more blocks of the block diagrams.

These computer program instructions may also be loaded onto the computer or other programmable data processing devices, so that a series of operational steps are performed on the computer or other programmable devices to generate a computer-implemented process, and the instructions executed on the computers or other programmable devices provide steps for implementing the functions specified in one or more processes of the flowcharts and/or one or more blocks of the block diagrams.

The foregoing descriptions are merely preferred embodiments of the disclosure, but are not intended to limit the disclosure. A person skilled in the art may make various alterations and variations to the disclosure. Any modification, equivalent replacement, or improvement made within the spirit and principle of the disclosure shall fall within the protection scope of the disclosure.

The foregoing specific implementations of the disclosure are described with reference to the accompanying drawings, but are not intended to limit the protection scope of the disclosure. A person skilled in the art should understand that various modifications or variations may be made without creative efforts based on the technical solutions of the disclosure, and such modifications or variations shall fall within the protection scope of the disclosure.

What is claimed is:

1. A control method for a hybrid cascaded APF topology which comprises: a three-phase cascaded H-bridge comprising bridge arms of three phases, the bridge arm of each phase comprising a plurality of H-bridge cells connected in series, and the bridge arms of the three phases being connected to a power system needing active filtering via inductors; and a three-phase H-bridge circuit connected at star connection points of the three-phase cascaded H-bridge, the three-phase H-bridge circuit comprising branches of the three phases and two capacitors connected in parallel across the branches of the three phases, and the branch of each phase comprising two switching transistors connected in series, wherein switching transistors of the H-bridge cells use Si devices, and the switching transistors of the three-phase H-bridge circuit use SiC devices, the control method comprising:

deriving a phase angle from line side three-phase voltages, performing abc/dq and dq/abc coordinate transformations based on the phase angle, deriving values of harmonic currents of uncompensated currents of the three phases based on an instantaneous reactive power theory, and with the values of the harmonic currents as given current values, generating an initial modulation wave by performing a coordinate transformation on output currents of the topology;

generating a voltage balancing signal according to a capacitive voltage value and a given value of the H-bridge cells of the bridge arms of the three phases; and superposing the voltage balancing signal with the initial modulation wave to generate a final modulation signal.

2. The control method for the hybrid cascaded APF topology according to claim 1, wherein a bridge arm extends from a midpoint of the two capacitors of the three-phase H-bridge circuit, the bridge arm being connected to the power system.

3. The control method for the hybrid cascaded APF topology according to claim 1, wherein a number of the H-bridge cells of the bridge arm of each phase is determined according to actual requirements for voltage levels.

4. The control method for the hybrid cascaded APF topology according to claim 1, wherein the H-bridge cells generate a fundamental voltage required by the APF topology by using a first switching frequency, the three-phase H-bridge circuit is responsible for a portion of the fundamental voltage or is not responsible for the fundamental voltage, and the three-phase H-bridge circuit uses a second switching frequency for harmonic compensation.

5. The control method according to claim 4, wherein the second switching frequency is greater than the first switching frequency.

6. The control method according to claim 4, wherein the portion of the fundamental voltage is 0%-40% of a total fundamental voltage.

7. The control method according to claim 4, comprising:

separating a modulation wave into a fundamental modulation wave and a harmonic modulation wave, comparing a magnitude of the fundamental modulation wave with a magnitude of a low-frequency carrier wave, and driving the switching transistors of the H-bridge cells according to a result of the comparison; and comparing a magnitude of the harmonic modulation wave with a magnitude of a high-frequency carrier wave, and driving the switching transistors of the three-phase H-bridge circuit according to a result of the comparison.

8. A computer-readable storage medium storing a plurality of instructions therein, wherein the instructions are loadable by a processor of a terminal device and suitable for performing the control method according to claim 4.

9. A terminal device, comprising: a processor and a computer-readable storage medium, wherein the processor is configured to execute instructions, and the computer-readable storage medium is configured to store a plurality of instructions, the instructions being loadable by a processor and suitable for executing the control method according to claim 4.

* * * * *